J. E. DOUGLAS.
RUNNER FOR BABY CARRIAGES.
APPLICATION FILED APR. 25, 1921.
1,416,454.
Patented May 16, 1922.
2 SHEETS—SHEET 1.
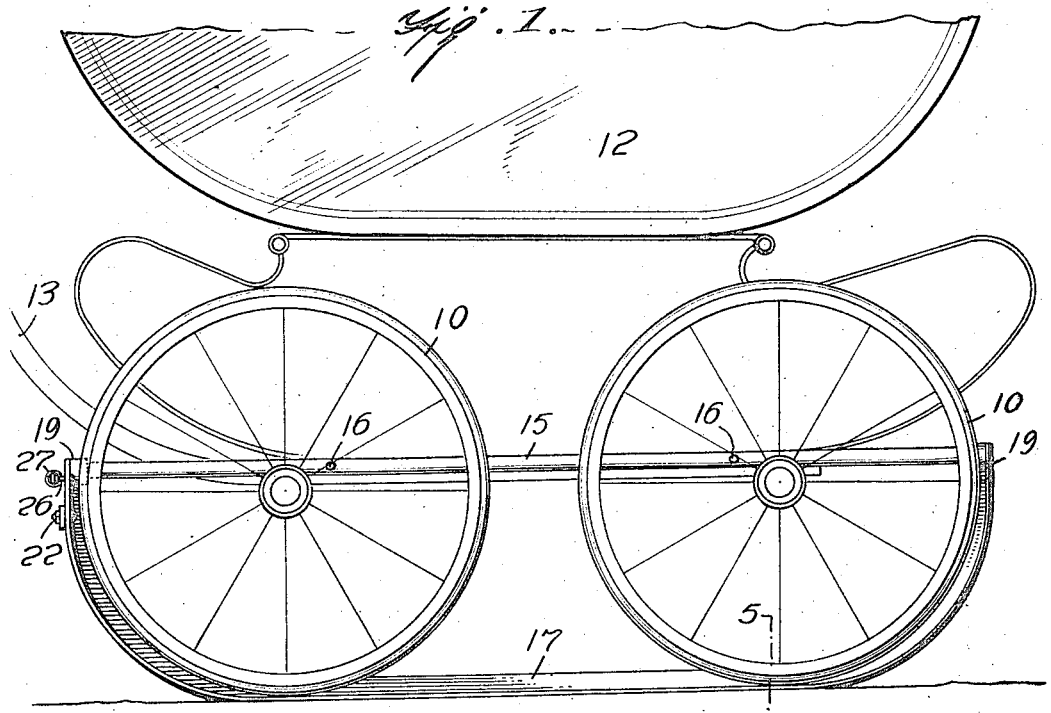
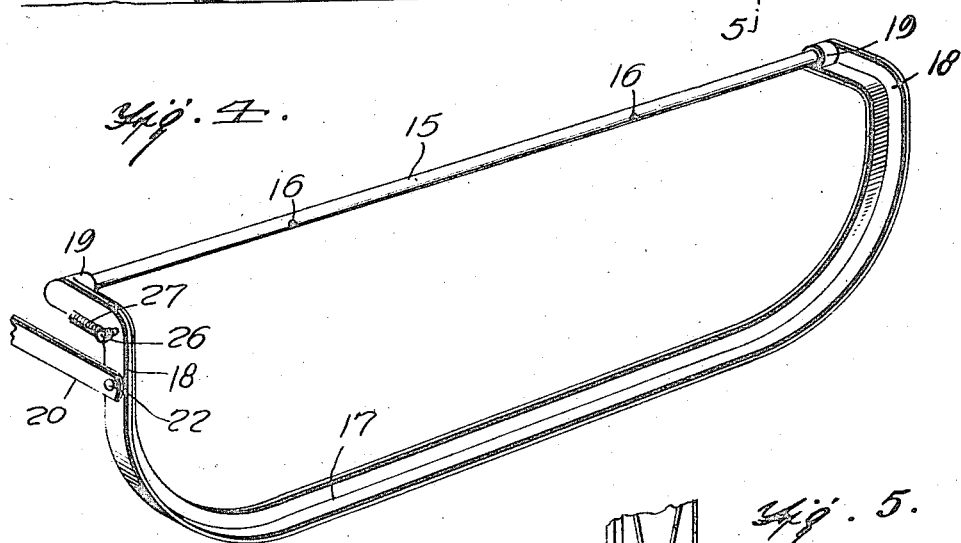
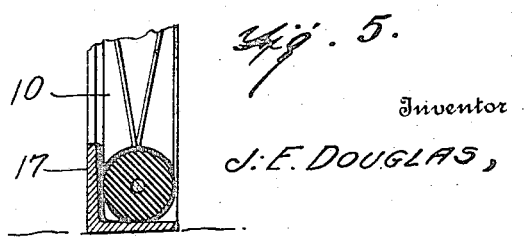
Inventor
J. E. DOUGLAS,
Attorney J. E. DOUGLAS.
RUNNER FOR BABY CARRIAGES.
APPLICATION FILED APR. 25, 1921.
1,416,454.
Patented May 16, 1922.
2 SHEETS—SHEET 2.
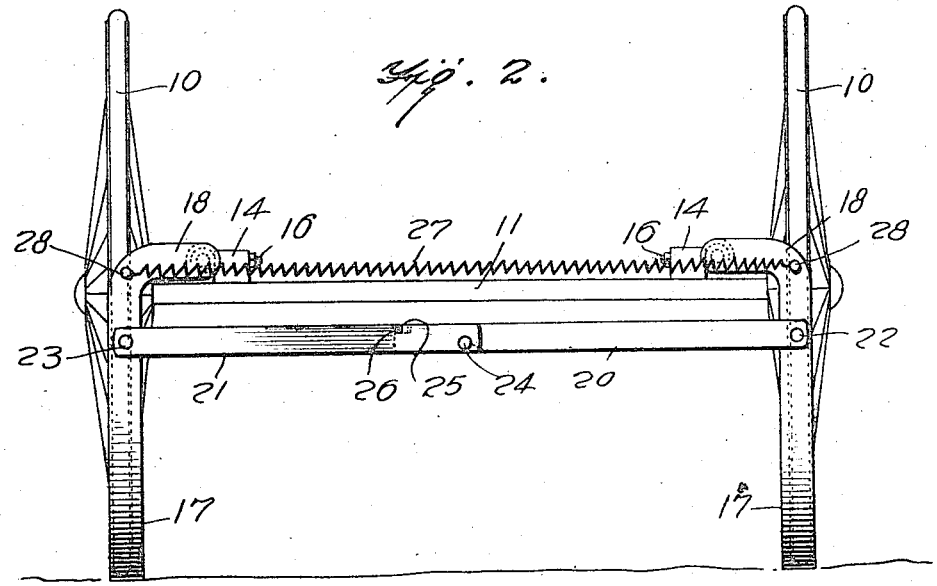
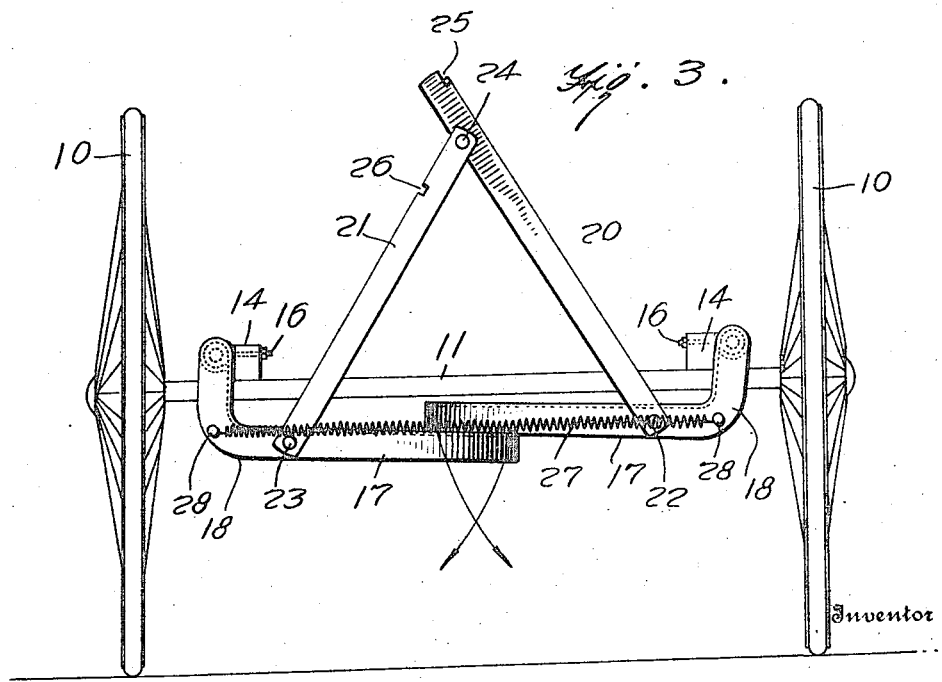
J. E. Douglas,
Inventor

UNITED STATES PATENT OFFICE.

JOHN E. DOUGLAS, OF ELLENSBURG, WASHINGTON.

RUNNER FOR BABY CARRIAGES.

1,416,454.     Specification of Letters Patent.     Patented May 16, 1922.

Application filed April 25, 1921. Serial No. 464,117.

*To all whom it may concern:*

Be it known that I, JOHN E. DOUGLAS, a citizen of the United States, residing at Ellensburg, in the county of Kittitas and State of Washington, have invented certain new and useful Improvements in Runners for Baby Carriages, of which the following is a specification, reference being had therein to the accompanying drawings.

This invention relates to runners for baby carriages and the like and has for an object to provide in combination with a baby carriage or like vehicle, supplied with the usual and ordinary supporting wheels, a set of runners continuously carried by the vehicle with improved means for conveniently applying the runners beneath the wheels to support the wheels and retain said wheels against rotation while applying runners for moving the vehicle over snow and the like.

A further object of the invention is to provide a set of runners, appropriately pivoted to the axles or like structures of a baby carriage with approved means for folding the runners beneath the axle out of position or for swinging them outwardly and downwardly to occupy positions beneath the peripheries of the wheels.

A further object of the invention is to provide a pair of runners having their ends appropriately curved to correspond substantially to the arcs of the wheels and pivoted to the running gear within the limits of the wheels so that the said runners may be swung upwardly out of position and maintained in inoperative position by a spring which is a part of the structure and to swing downwardly and outwardly against the tension of the spring to occupy the position of runners beneath the wheels.

With these and other objects in view, the invention comprises certain novel units, parts, elements, mechanical movements, functions and combinations as will be hereinafter more fully described and claimed.

In the drawings:

Figure 1 is a view in side elevation of a conventional baby carriage with the runners applied thereto in operative position.

Figure 2 is an end view of the running gear of a baby carriage with the runners applied thereto in operative position.

Figure 3 is an end view of the running gear of a baby carriage with the runners supported thereby and held out of operative position.

Figure 4 is a perspective view of one of the runners.

Figure 5 is a sectional view radial of one of the wheels and transversely through the runner as indicated by line 5—5 of Figure 1.

Like characters of reference indicate corresponding parts throughout the several views.

The improved organization which forms the subject matter of this application is adapted to be applied to a baby carriage or similar vehicle having supporting wheels 10, axles 11 and provided with any approved type of body as indicated at 12, and handles 13.

It is to be understood that the type of carriage is wholly immaterial to the present invention. In proper spaced relation upon the axles 11 blocks 14 are mounted to which are secured longitudinal rods 15 in any approved manner as by bolting at 16. The rods 15 are of slightly greater length than the maximum distance between the peripheries of the wheels and have pivoted thereto runners 17. As shown in the drawings, these runners 17 are constructed of angle iron which is, generally speaking, the preferred structural material, although it is to be understood that the invention is not limited to this identical form of structure. The runners 17 are bent at 18 so that the major portion of the runners may be properly positioned beneath and under to support the wheels 10 as shown more particularly at Figures 1 and 2, while the extremities of said runners will be positioned at the extremities of the rods 15 and pivoted thereto in any approved manner as by rolling a part of the flange about the extremity of the said rod, as indicated at 19. It will be apparent that the size, shape and proportion of the runners 17 will be made to correspond to the requirements of the wheel structure and spacing of the carriage and that any showing herein as to proportion or shape is subject to variation to correspond to such variation in carriage structure.

Somewhat below the bends 18 bars 20 and 21 are pivoted to the runners, such pivoting being shown at 22 and 23 respectively. The bars 20 and 21 are pivoted together at 24 and the bar 20 is provided with a detent 25 properly proportioned to engage in a notch 26 in the bar 21. When, therefore, the bars 20 and 21 are swung downwardly from the position shown at Figure 3 they force the runners outwardly against the tension of the spring 27 which is attached to the runners 17 at 28. When the bars 20 and 21 have been moved to the position shown at Figure 2, the lug 25 engages in the notch 26 and holds the runners 17 in operative position, as shown at Figures 1 and 2, beneath the wheels 10. When it is desired to restore the vehicle to its condition as a wheeled vehicle, it is only necessary to raise the pivoted joint 24 from the position shown at Figure 2 whereupon the spring 27 will act to withdraw the runners to the position shown at Figure 3, holding the runners in such position and out of engagement until again required for use.

What I claim is:

1. The combination with a wheeled vehicle of bars extending longitudinally of the vehicle between the wheels, runners pivoted to the extremities of the bars and appropriately formed to swing outwardly and downwardly to occupy positions beneath the wheels, arms pivoted to the runners and pivoted together adapted, when extended, to swing the runners into operative position and to limit the movement, and a spring connected with the runners adapted, when the arms are released, to draw the runners toward each other into inoperative position between the wheels.

2. The combination with a wheeled vehicle having axles of rods extending longitudinally of the vehicle between the wheels and rigidly secured to the axles, runners having their extremities pivoted to the extremities of the rods and appropriately formed to swing outwardly and downwardly to occupy positions beneath the wheels, arms pivoted to the runners and pivoted together adapted, when raised, to permit the movement of the runners toward each other into inoperative position and when extended to swing the runners outwardly into operative position beneath the wheels, and springs attached to the runners adapted to yieldingly hold the runners in inoperative position.

In testimony whereof I hereunto affix my signature in presence of two witnesses.

JOHN E. DOUGLAS.

Witnesses:
 GLADYS BATES,
 G. P. SHORT.